UNITED STATES PATENT OFFICE.

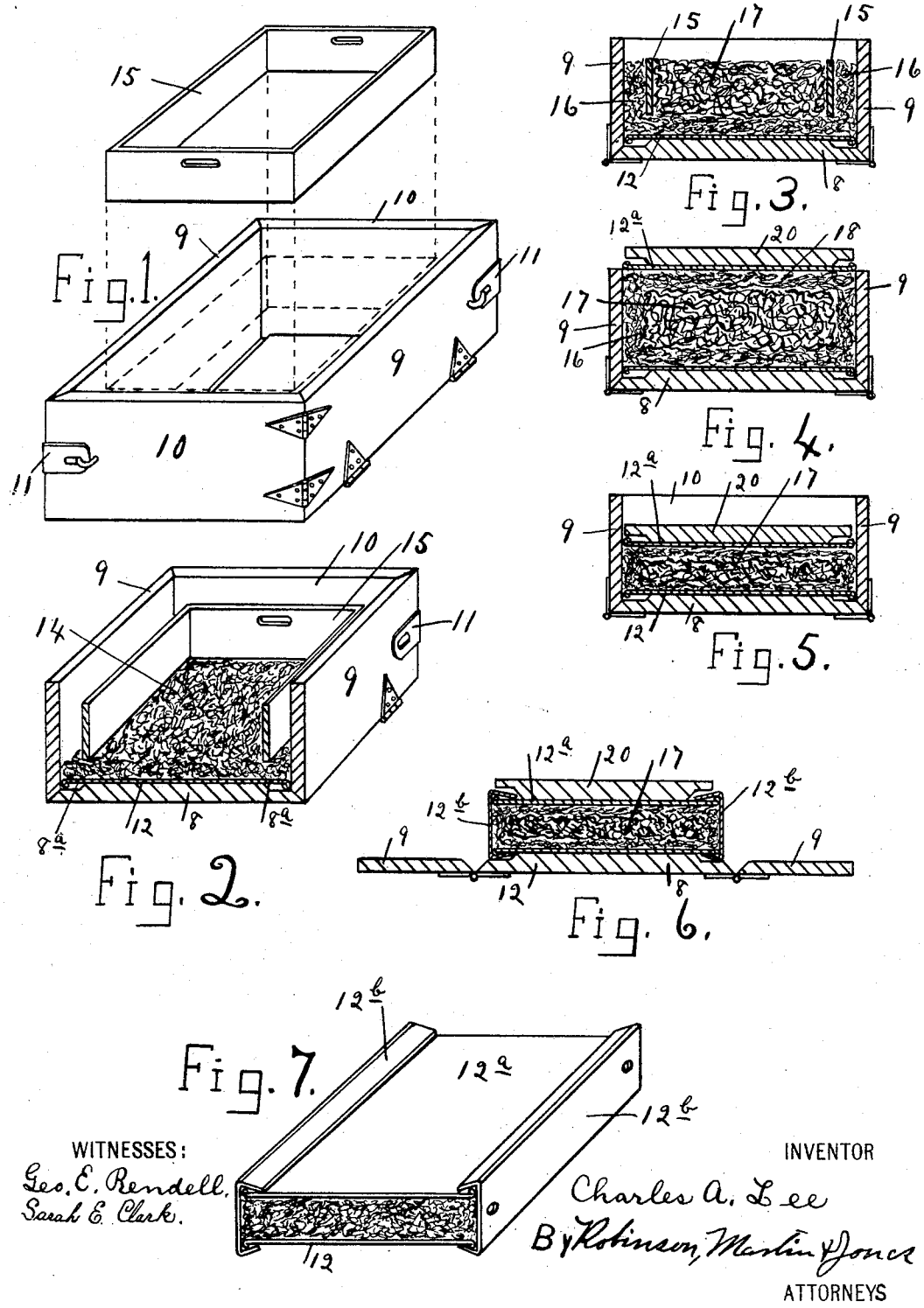

CHARLES A. LEE, OF ONEIDA, NEW YORK.

CUSHION-STUFFING DEVICE.

939,278.  Specification of Letters Patent. Patented Nov. 9, 1909.

Application filed December 23, 1907. Serial No. 407,659.

*To all whom it may concern:*

Be it known that I, CHARLES A. LEE, of Oneida, in the county of Madison and State of New York, have invented certain new and useful Improvements in Cushion-Stuffing Devices; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide an improved apparatus for preparing and forming the filling for cushions, which is simple in construction and efficient in operation.

Figure 1 is a perspective view of the forming receptacle and of the filling formed in separated pieces. Fig. 2 is a cross-sectional perspective view of the device in one of the early stages of forming the filling. Fig. 3 is a cross-sectional view in a subsequent stage of the process. Fig. 4 is a cross-sectional view in still a later stage. Fig. 5 is a cross-sectional view showing the process in a still later stage. Fig. 6 is a cross-sectional view showing the process in the last stage. Fig. 7 is a perspective view showing the filling confined in a temporary casing preparatory to introducing it into the cushion cover.

Referring to the reference letters and figures in a more particular description, 8 indicates the bottom of the forming receptacle to which is hinged directly by their lower edges the sides 9 and indirectly the ends 10. The sides and ends may be held in closed position by clasps as 11. Along each side the bottom 8 will preferably be provided with grooves or rabbets $8^a$.

In using the device the sides and ends of the forming receptacle are closed and secured, as shown in Fig. 1, and one side wall 12 of the temporary filling case is placed in position in the bottom of the receptacle. The layer 14 of cushion filling of good quality of material, as for instance hair or jute fiber, is then placed over the piece 12 in the bottom of the receptacle as shown in Fig. 2. After this has been done the filling form 15, which consists of a frame having relatively thin walls and open at the top and bottom and being of less height than that of the walls of the receptacle, is placed in the receptacle and located so as to provide a substantially uniform space between the outer side of the frame and the inner face of the receptacle walls on each side and end. The walls of the form 15 will preferably be less in height than that of the receptacle sides. After the filling form 15 has been located, as described, the space between the form and the walls of the receptacle may be filled with the same quality of cushion filling material as indicated by 16, while the space within the filling form may be filled with a poorer quality of cushion filling as indicated at 17. This poorer and cheaper quality of material may be excelsior or something better. When the filling has been thus placed, as is shown in Fig. 3, the filling form 15 will then be withdrawn upwardly leaving the part 17 nicely arranged and located with reference to the remaining parts of the filling. After the withdrawal of the filling form 15, a layer of the good quality of filling, as indicated at 18, may be placed over the whole area of the top of the filling receptacle and which will preferably bring the surface level with the upper edges of the sides and ends of the forming receptacle. The other plate $12^a$ of the temporary filling case may then be placed and forced down by a follower 20, as indicated in Figs. 3 and 4. When in this condition the end and side walls of the forming receptacle may be loosened and opened, which permits the edge clamps $12^b$ to be applied. The grooves or rabbets $8^a$ in the bottom, as well as similar rabbets in the face of the follower 20, permit these edge clamps to be applied with facility. After the edge clamps are applied the pressure form and the follower 20 may be removed and the cushion filling will be held confined in the temporary casing as shown in Fig. 7. After being inserted in the cushion case the several parts of the temporary casing may be successively withdrawn leaving the filling well placed or disposed in the cushion case. It is evident that the parts of the forming receptacle may be readily arranged for a repetition of the forming up process.

By having the depth of the walls of the filling form of suitable proportion with reference to the height of the walls of the forming receptacle, the operator will lie greatly assisted in placing the right proportion of material in the layers in the bottom and on the top of the forming receptacle and introducing the correct quantity of material inside of the filling form.

What I claim as new and desire to secure by Letters Patent is:

In a device for stuffing cushions the combination of a forming receptacle having opening side walls and a bottom and a filling receptacle substantially the same form as the interior of the forming receptacle and less in all its dimensions and consisting of a frame having side and end walls only, substantially as set forth.

In witness whereof, I have affixed my signature, in presence of two witnesses, this 18th day of December 1907.

CHAS. A. LEE.

Witnesses:
SARAH E. CLARK,
GEO. E. RENDELL.